March 9, 1954     H. J. TALGE     2,671,617
HAND-OPERATED COFFEE MILL WITH SELF-LOCKING
STRUCTURE FOR ADJUSTMENT OF SIZE OF GRIND
Filed July 26, 1951
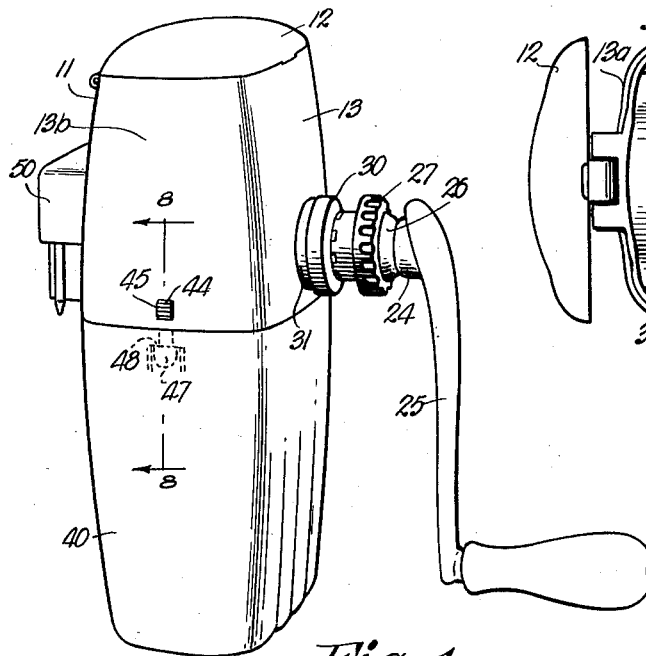
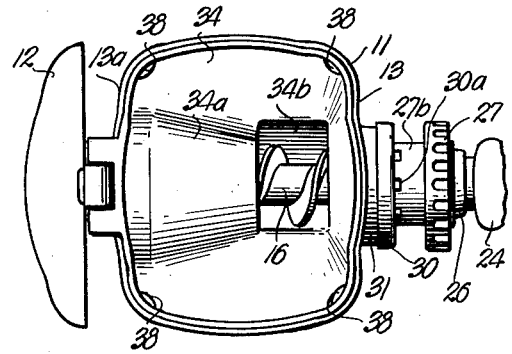
INVENTOR.
Henry J. Talge
BY
Thos. E. Scofield
ATTORNEY.

Patented Mar. 9, 1954

2,671,617

UNITED STATES PATENT OFFICE 2,671,617

HAND-OPERATED COFFEE MILL WITH SELF-LOCKING STRUCTURE FOR ADJUSTMENT OF SIZE OF GRIND

Henry J. Talge, Kansas City, Mo., assignor to John C. Hockery, Kansas City, Mo., trustee Application July 26, 1951, Serial No. 238,710

3 Claims. (Cl. 241—247)

1

This invention relates in general to coffee mills and deals more particularly with coffee mills of the hand-operated household type.

Heretofore, coffee mills of this character usually have been jerky and noisy in action, and the resistance to the turning of the grinding burrs has been very uneven because of unevenness in the flow of the coffee beans into the burrs (usually by gravity); at times considerable exertion on the part of the operator has been required in order to continue the grinding. In addition to these objectionable features, the mills ordinarily have lacked flexibility and ease of adjustment as to regulation of the fineness and coarseness of the grind.

A principal object of this invention is to provide a coffee mill which improves on the prior coffee mills in that the mill effects better and more uniform grinding with less effort on the part of the operator and operates smoothly, quietly and quickly; and a mill which feeds the coffee beans evenly and positively into the grinding burrs and at the same time conditions the beans to offer reduced resistance to being ground.

Another object of this invention is to provide a coffee mill of the above-mentioned type, which can be easily and quickly adjusted manually to vary the size of the grind throughout a wide range of coarse, fine, and intermediate grinds, and, when so adjusted, is self-locking in a secure manner in said adjustment.

A further object of this invention is to provide a coffee mill of the character referred to and one which is compact, light in weight, attractive in appearance, inexpensive to construct, comprises few and simple parts, while at the same time it is sturdy and durable in all respects.

Other objects of this invention will be in part obvious and in part pointed out hereinafter.

In accordance with this invention, the coffee mill has coffee bean cracking and feeding means including a helical feed screw or worm which positively feeds the coffee beans from the mill hopper into the grinding means and at the same time serves to crack the coffee beans as they are fed into the grinding means. The mill is also provided with a grind selector knob which is manually rotatable into different settings and is so connected to one of the two complemental grinding burrs that turning of the knob in one direction draws said one burr progressively closer to the other burr, thus making the grind more fine, and turning the knob in the opposite direction spaces said one burr progressively further from the other burr thus making the grind

2 coarser; and a manually retractable spring latch is provided which, upon release by the operator, automatically locks the knob against grind changing rotation.

The invention accordingly consists in the features of construction, combinations of elements and arrangement of parts which will be described more fully hereinafter, and the scope of the application of which will be pointed out in the claims that follow.

In order that a clearer understanding of this invention may be had, attention is hereby directed to the accompanying drawings, forming a part of this application, and illustrating certain possible embodiments of this invention, and in which:

Fig. 1 is a perspective view of a coffee mill embodying this invention;

Fig. 2 is a top plan view thereof with the cover open, only a fragmentary portion of the handle being shown;

Fig. 3 is a vertical sectional view through the operating portion of the mill and is taken on the line 3—3 of Fig. 2;

Fig. 4 is a plan view looking upwardly into the part of the mill which is above the grind catching receptacle, the outer grinding burr being broken away to show the inner burr; and Figs. 5, 6 and 7 are different sectional views of certain details of the construction and are taken respectively on lines 5—5, 6—6, and 7—7 of Fig. 3.

Fig. 8 is a sectional view taken along the line 8—8 of Fig. 1 in the direction of the arrows.

Similar reference characters refer to similar parts throughout the several views of the drawings.

Referring to the drawings, the coffee mill as shown includes a generally tubular housing or casing 11, having a hinged cover 12 at the top, open at the bottom and conveniently may be four sided as shown. Extending through two opposite sides 13 and 13a of the casing near its lower end is a shaft 14 which has a hexagonal portion 15 at its center; and a work or feed screw 16 having a hexagonal bore is mounted on the hexagonal portion 15 of shaft 14 to rotate therewith. At one end of the feed screw 16 a conical grinding burr 17 having a hexagonal hole in its base 17a is also mounted on the hexagonal portion 15 of the shaft 14 to rotate therewith. The side of the base 17a of the grinding cone 17 which faces the feed worm constitutes an anvil surface against which the feed worm compresses the coffee beans so as to crack the beans before they are subjected to the grinding means.

One end of the shaft 14 carries a sleeve 18, one end of which abuts against a washer 18a that serves as an enlarged head seating against the inside of the base 17a of the grinding cone 17. The other end of sleeve 18 is journalled in a boss 19 formed on the casing wall 13a, the associated end of the shaft 14 protruding from the boss 19 and being threaded to receive a nut 20; this nut has an annular flange 20a which seats against the end of the sleeve 18, and the body of the nut 20 does not engage the boss 19 of the casing except when the mill is set to finest grind, as will appear hereinafter.

The opposite end of shaft 14 carries a sleeve 21, the inner end of which seats against the adjacent end of the feed worm 16 and extends through an externally threaded boss 22 formed on the casing wall 13. Sleeve 21 has an annular shoulder or flange 21a a short distance from its outer end. To the outer end of shaft 14 is secured the hub 24 of an operating handle 25, and a ball race 26 is disposed on shaft 14 between the hub 24 of handle 25 and the outer end of the sleeve 21. The inner member 26a of the ball race abuts the inner end of the sleeve 21, and forms with the ball race 26 and hub 24 an abutment means against which the sleeve 21 is tightened by tightening the nut 20.

An internally threaded grind selector knob 27 is mounted for adjustment by rotation on the threaded boss 22 and has an inwardly directed annular flange or shoulder 27a which seats between the flange 21a of sleeve 21 and the inner member 26a of the ball race 26.

An annular releasable latch 30 is slidably mounted on the boss 22 and has detent lugs or fingers 30a adapted to engage in complementary keeper notches 27b formed in the inner end of the selector knob 27. The latch 30 has an annular flange 30b which is slidably and telescopically related to an annular flange 31 formed on the side wall 13 of the casing 11 about and spaced from the boss 22; a compression coil spring 32 disposed in the space between boss 22 and flange 31 is compressed between the casing wall 13 and the body of latch 30, so that the latch may be slid inwardly manually out of engagement with the knob 27 and, when released, the spring 32 will automatically move the latch toward and into latching engagement with the selector knob 27. To prevent the latch 30 from turning on the boss 22 the body of latch 30 is formed to have interior flat surfaces 30c which seat against flat surfaces 22a formed on the outer surface of the boss 22. Thus when the knob 27 is engaged by the latch the knob is locked against being turned on the boss.

Within the casing 11 and encircling the grinding cone 17 is a complementary grinding cone 33 supported by a cross plate 34 in the casing 11; the cone 33 has lugs or ears 33a (Fig. 4) fastened as by screws 35 to lugs 36 formed on the underside of the cross plate 34. The cross plate has a raised portion 34a which conforms in shape to and fits over the top portion of the milling cone 33, and is formed with a depressed portion 34b in which the feed screw 16 is disposed and exposed. The side of the depressed portion 34b toward the milling cones 17, 33 is open into the throat of these cones, and the other sides of the depression 34b are closed against the spilling of coffee beans therethrough.

The cross wall 34 at the mill handle side rests on and is supported by the sleeve 21 which is carried on the shaft 14. The opposite edge of the cross wall 34 is loose but the whole cross wall is prevented from upward movement by vertical ribs or lugs 38 formed on the interior of casing 11 above and overlapping the cross plate 34. This cross plate 34 constitutes the bottom of the hopper which is defined by this plate and the sides of the casing 11 extending upwardly therefrom.

The outer ends of the grinding cones or burrs 17 and 33 are spaced inwardly of the adjacent wall 13a of the casing 11 to leave a space 39 through which the ground coffee will drop by gravity into a receptacle or cup 40 which is removably hooked to the open bottom of the casing 11 by any suitable manually releasable latching means. For instance, as shown, there is a releasable latch at each of the opposite sides 13b of the casing 11 below the cross wall 34. Each latch assembly includes a depending arm 41 formed integrally on the under surface of cross wall 34 and which arm is spaced a distance inwardly of the casing side wall 13b. Between each arm 41 and the casing wall is disposed vertically at latch bar or lever 42 which is resiliently pressed outwardly against the casing wall 13b by a leaf spring 43 disposed between the latch lever 42 and the arm 41. This latch lever 42 has intermediate its ends an outwardly directed button 44 which extends through a hole 45 provided therefore in the side wall 13b of the casing whereby the lever 42 is prevented from dropping downwardly out of the casing 11; a stop lug 46 is formed in the lower end of the cross wall arm 41 which prevents the button 44 from being pushed inwardly sufficiently to become disengaged from the casing hole 45. The lower end of the lever arm 42 extends below the bottom edge of the casing 11 and there is provided with an outwardly extending hook or detent lug 47 which when the top of the receptacle 40 is brought up close against the bottom edge of the casing 11, is adapted to snap under a shoulder 48 in suitable location on the inside of the adjacent side wall of the receptacle 40. The arrangement is such that to release the receptacle 40 from the casing 11 it is only necessary to manually push in one of the buttons 44 a sufficient distance to withdraw the detent lug 47 from under the shoulder 48 in the receptacle 40 and tilt the receptacle 40 slightly inwardly; such tilting lifts the shoulder 48 of the opposite receptacle side wall off of the detent 47 on that side.

The casing 11 is also provided with an exterior bracket 50 of any suitable type whereby the mill may be hung on or otherwise secured to a support, such, for instance, as woodwork in a room.

The coffee mill is adapted to be used in the usual way, that is by placing a charge of coffee beans in the hopper and rotating the handle 25. The helices of the feed screw 16 not only feed the beans positively and forcibly from the hopper but also so compress the beans against each other and against the grinding burrs 17 and 33 at their throat and against the anvil surface 17a that the beans are cracked before they are forced into the burrs. This results in smoother, easier, quieter, quicker and more even grinding.

The fineness or coarseness of the grind produced can be adjusted to any one of a number of different degrees of grind over a very wide range; and when adjusted the mill automatically becomes locked in the adjustment to which it has been set. To change the grind it is only necessary for the operator to retract the latch ring 30 from the selector knob 27 by pushing toward the housing, and then turn the knob 27 one way or the other to change the grind to the different grind desired. Then when the latch ring 30 is released the spring 32 will snap the latch ring back into latching engagement with the selector knob 27 and the coffee mill is locked in the grind adjustment to which the selector knob has been turned.

The variation and selection of the fineness and coarseness of the grind by turning the selector knob 27 on the boss 22 is due to the fact that when the nut 20 is screwed tightly against the end of sleeve 18, this sleeve 18, the grinding burr 17, the feed screw 16, the sleeve 21 and the ball race 26 are tightly clamped together endwise between the nut 20 and the hub 24 of handle 25 so that the entire assembly, including the shaft 14, which is engaged by the nut 20 and handle hub 24, must shift axially in unison. When the selector screw is rotated clockwise its flange 27a which is seated between the head 21a of sleeve 21 and the ball race 26 pushes against the head 21a of sleeve 21 and shifts the assembly in unison to the left, as viewed in Fig. 3, and thus moves the inner grinding burr 17 away from the outer grinding burr 33 and establishes a coarser grind. Conversely, when the selector knob 27 is turned counterclockwise the flange 27a of the selector knob pushes against the ball race 26 and shifts the assembly in unison to the right (Fig. 3) and thus places the inner grinding burr 17 closer to the outer grinding burr 33 and establishes a finer grind.

In addition to the above features, it is seen that the coffee mill comprises relatively few parts, and that the parts are simple, sturdy and durable; and that the coffee mill is relatively light in weight and is attractive in appearance.

As many changes can be made in the above construction and many different embodiments of this invention can be made without departing from the scope thereof, it is understood that all matter contained in the above description or shown in the accompanying drawings should be interpreted as illustrative and not in a limiting sense.

Having thus described my invention, I claim:

1. A coffee mill of the character described, including, in combination, a casing, an outer grinding cone mounted in said casing, the axis of said cone being horizontal, a feed trough adjacent the smaller end of said cone and aligned therewith, a horizontal shaft extending coaxially through said cone and trough and rotatably mounted on said casing, the opposite ends of said shaft protruding from opposite sides of the casing, an inner grinding cone having an end wall at its smaller end and slidably received on said shaft and positioned coaxially within said outer grinding cone, a coaxial feed worm also slidably received on said shaft and positioned in said feed trough with its discharge end adjacent the outer surface of said end wall of said inner grinding cone, said inner grinding cone and feed worm and shaft being provided with cooperating surfaces preventing relative rotation therebetween, the shaft at one end carrying a front sleeve having one end disposed adjacent the inner surface of the said end wall of the inner cone, the shaft at the other end carrying a rear sleeve having one end abutting an end of the feed worm and the other end protruding from the casing, abutment means on the shaft abutting said protruding end of said rear sleeve, a nut threaded on the opposite end of the shaft and abutting the front end of said front sleeve whereby said front sleeve, inner grinding cone, feed worm, and rear sleeve are tightly clamped together in fixed longitudinal positions on said shaft to form a shaft assembly, and means connected with said shaft assembly and operable to shift said shaft assembly axially within said casing to vary the grinding space between the two grinding cones.

2. A coffee mill as set forth in claim 1, wherein said last means includes an exterior boss on said casing having an axial bore receiving said shaft and rear sleeve and provided with threads on its exterior, and a selector knob threaded onto said boss and connected to said shaft assembly whereby rotative adjustment of said selector knob on said boss effects the axial shifting of said shaft assembly.

3. In a coffee mill of the character described, in combination, a casing having an exterior boss having an axial bore and screw threads on its exterior near its outer end, an outer grinding cone mounted in said casing, a shaft rotatably and axially shiftably mounted in said casing, and extending through the bore of said boss and co-axially through said outer grinding cone, an inner grinding cone mounted on said shaft to rotate and shift therewith and disposed co-axially within said outer grinding cone, a selector knob member threaded on said boss and connected with said shaft whereby rotative adjustment of the selector knob on said boss shifts said shaft horizontally relative said casing to effect a change in spacing between said inner and outer grinding cones, an annular latch member surrounding said boss between said knob member and the casing and axially movable therebetween, means preventing rotation of said latch member relative said boss, means yieldably urging said latch member toward said knob member, and disengageable cooperating means on said latch member and said knob member operating to prevent rotation of said knob member.

HENRY J. TALGE.

References Cited in the file of this patent

UNITED STATES PATENTS

| Number | Name | Date |
|---|---|---|
| 933,008 | Warner | Aug. 31, 1901 |
| 1,567,246 | Costa | Dec. 29, 1925 |
| 1,769,776 | Dryden | July 1, 1930 |
| 1,947,342 | Hess | Feb. 13, 1934 |

FOREIGN PATENTS

| Number | Country | Date |
|---|---|---|
| 32,457 | Sweden | Mar. 13, 1912 |
| 231,048 | Great Britain | Mar. 26, 1925 |
| 978,664 | France | Nov. 29, 1950 |